United States Patent
Lou et al.

(10) Patent No.: US 7,274,469 B2
(45) Date of Patent: Sep. 25, 2007

(54) METHOD AND APPARATUS FOR CALIBRATING LASER 3D DIGITIZING SENSOR

(75) Inventors: Wen-Shiou Lou, Hsinchu (TW); Ming-Wheng Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 299 days.

(21) Appl. No.: 10/620,458

(22) Filed: Jul. 17, 2003

(65) Prior Publication Data

US 2004/0036891 A1 Feb. 26, 2004

(30) Foreign Application Priority Data

Aug. 22, 2002 (TW) .............................. 91118977 A

(51) Int. Cl.
  *G01B 11/24* (2006.01)
  *G01B 11/30* (2006.01)
  *G06K 9/00* (2006.01)
  *G01N 21/86* (2006.01)
  *G01V 8/00* (2006.01)

(52) U.S. Cl. ...................... 356/602; 356/601; 356/606; 382/154; 250/559.1; 250/559.22

(58) Field of Classification Search ...................... None
See application file for complete search history.

(56) References Cited

U.S. PATENT DOCUMENTS 4,188,544 A * 2/1980 Chasson ................ 250/559.06
4,682,894 A * 7/1987 Schmidt et al. ............. 356/614
4,925,308 A    5/1990 Stern et al.
5,852,672 A * 12/1998 Lu .............................. 382/154
6,101,455 A *  8/2000 Davis .......................... 702/94
6,377,701 B1 *  4/2002 Ohki .......................... 382/154
6,798,527 B2 *  9/2004 Fukumoto et al. .......... 356/602
7,206,080 B2 *  4/2007 Kochi et al. ................. 356/611

FOREIGN PATENT DOCUMENTS

| CN | 1354355 A | * | 6/2002 |
| JP | 08005351 A | * | 1/1996 |
| JP | 08-035828 | | 2/1996 |
| JP | 10-047920 | | 2/1998 |
| JP | 10047920 A | * | 2/1998 |
| JP | 2000161935 A | * | 6/2000 |
| TW | 530970 Y | | 5/2003 |
| TW | M280609 U | | 11/2005 |

\* cited by examiner

*Primary Examiner*—Gregory J. Toatley, Jr.
*Assistant Examiner*—Gordon J Stock, Jr.
(74) *Attorney, Agent, or Firm*—Birch, Stewart, Kolasch & Birch, LLP

(57) ABSTRACT

A method for calibrating a laser three-dimensional digitizing sensor. First, a three-dimensional coordinator X-Y-Z is defined and a calibrating surface is provided. Second, a first mapping table of a two-dimensional digital image to the Z axis is established by translating the calibrating surface along the Z axis. Subsequently, the calibrating surface rotates along the Y axis by a predetermined angle and translates along the Z axis to establish the second mapping table of the two-dimensional digital image and the X axis according to the first mapping table.

3 Claims, 5 Drawing Sheets

METHOD AND APPARATUS FOR CALIBRATING LASER 3D DIGITIZING SENSOR

BACKGROUND OF THE INVENTION

1. Field of the Invention

The present invention relates to a method and apparatus for calibrating a laser three-dimensional (3D) digitizing sensor, and in particular to a method and apparatus for calibrating a laser three-dimensional digitizing sensor having the advantages of simple operation, high accuracy and low cost.

2. Description of the Related Art

Optical triangulation systems are widely used to calibrate three-dimensional space. Such calibration systems are applicable in the fields of machine vision and automatic optical inspection, particularly for manufacturing or assembling processes. Conventional calibration of a three-dimensional space is usually expensive due to complicated processes which require high accuracy. Therefore, it is important to provide a precise calibration system with high accuracy, simple operation, and low cost. As shown in FIG. 1, a conventional three-dimensional measurement system comprises a laser emitting device 1, a first optical calibrating set 11, an optical sensor 2, a second optical calibrating set 21 and an object 3. Light emitted from the laser emitting device 1 passes through the first optical calibrating set 11 and is projected onto the object 3 forming a bright point thereon. The optical sensor 2 is similar to a camera generating a digital image by capturing the reflected light passing through the second optical calibrating set 21 from the object 3. Thus, the 3D coordinate of each point on the surface of object 3 can be determined and a complete 3D model can be reconstructed by 3D scanning technology. However, complex parameters and computing processes are inevitably considered and involved during the translation of the digital image data to 3D coordinates. Particularly, when using different optical components to obtain an accurate measurement, it may be difficult to perform the complex processes such as camera parameter estimation, lens distortion compensation, coordinate translation, and laser parameter estimation. Therefore, it is usually expensive and complicated to perform conventional calibration of a three-dimensional space as mentioned above.

To address the disadvantages of conventional 3D calibration, a related art has been disclosed in U.S. Pat. No. 4,925,308 entitled "Calibration of Three Dimensional Space" based on the traditional optical triangulation measurement. The calibration of U.S. Pat. No. 4,925,308 utilizes a calibrating block in a Cartesian X-Y-Z coordinate system, wherein the block has three flat plates respectively in accordance with XY, YZ, and XZ planes perpendicular to each other. To perform the calibration, the optical sensor is preferably sloped at 45 degrees to the flat plates. The calibration the Z axis is accomplished by translating the light projected on the XY plate. Similarly, the X and Y axes can also be calibrated by translating the light projected on the YZ and XZ plates.

The calibration of U.S. Pat. No. 4,925,308 is applied to a point scanning laser sensor only, however, the present invention can provide a calibration method and apparatus for a line scanning laser sensor. In U.S. Pat. No. 4,925,308, reflective conditions and plate flatness dominate the accuracy of measurement, appropriate compensation and modification processes must be employed such that it is more difficult and complicated to calibrate the three-dimensional space. Moreover, the laser sensor is usually sloped by suspension such that it is difficult to install in a large-sized sensor such as a body scanner. The calibration of U.S. Pat. No. 4,925,308 requires a precise positioning system including a high accuracy linear translating platform and flat plates which occupy a large area and are expensive.

To address the disadvantages of the conventional calibration system as mentioned above, the present invention provides a method and apparatus for calibrating a laser three-dimensional (3D) digitizing sensor with simple operation, high accuracy and low cost.

SUMMARY OF THE INVENTION

An object of the present invention is to provide a method and apparatus for calibrating a laser three-dimensional (3D) digitizing sensor having the advantages of simple operation, high accuracy, and low cost. First, a three-dimensional coordinator X-Y-Z is defined and a calibrating surface is provided. Second, a first mapping table of a two-dimensional digital image to the Z axis is established by translating the calibrating surface along the Z axis. Subsequently, the calibrating surface rotates along the Y axis in a predetermined angle and translates along the Z axis to establish the second mapping table of the two-dimensional digital image and X axis according to the first mapping table.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1:
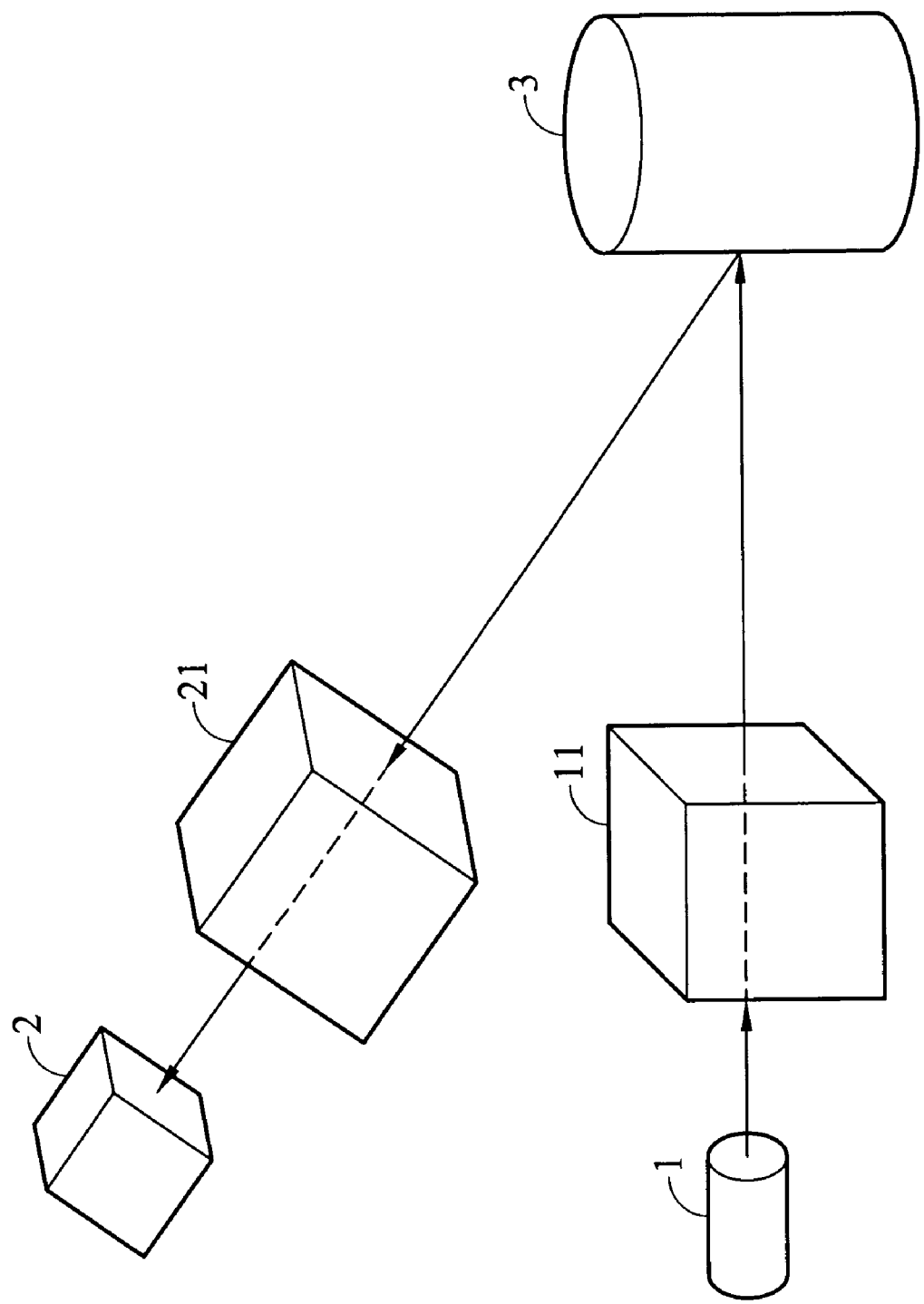
FIG. 1 is a perspective diagram of a conventional laser three-dimensional (3D) measurement system.
Figure 2:
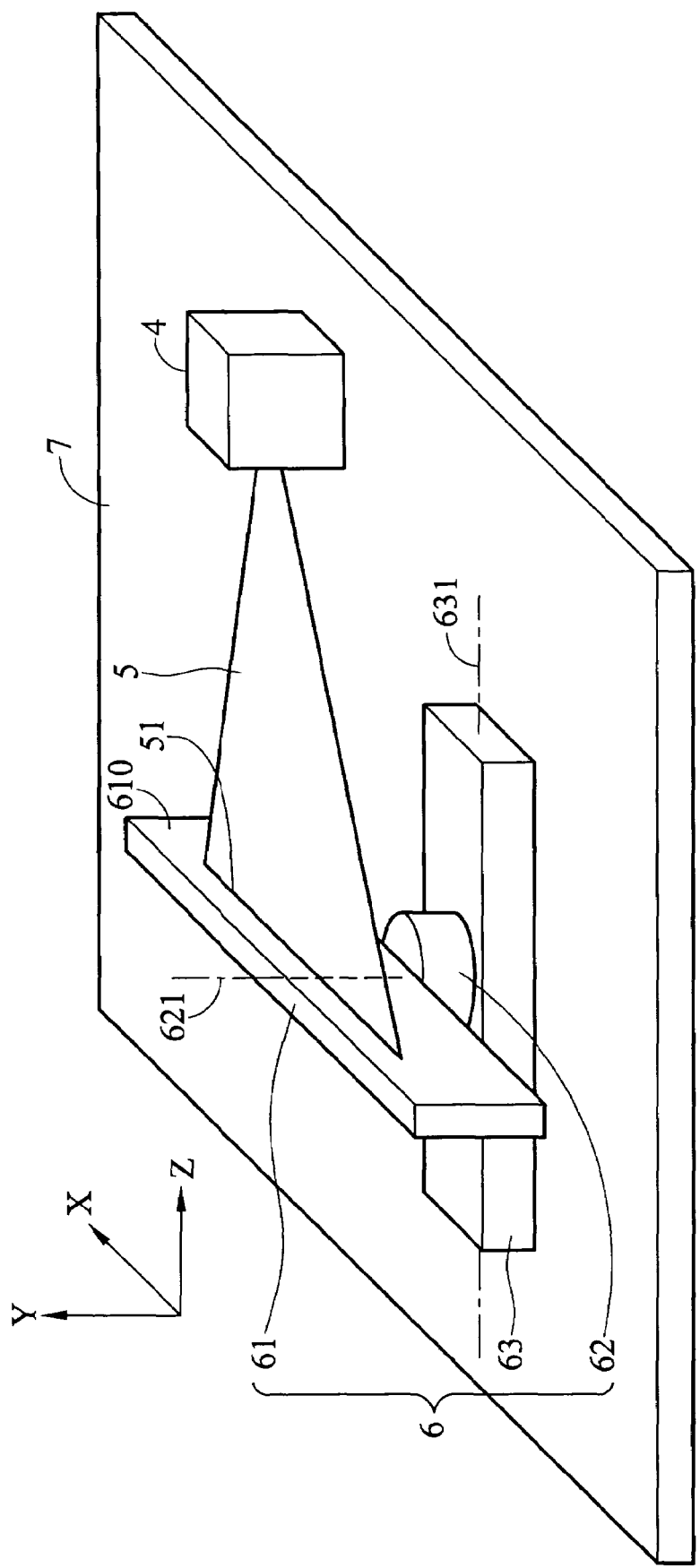
FIG. 2 is a perspective diagram of the apparatus for calibrating a laser three-dimensional (3D) sensor in accordance with the present invention.

FIG. 2 is a perspective diagram of the apparatus for calibrating a laser three-dimensional (3D) sensor in accordance with the present invention. Referring to FIG. 2, the present invention is provided with a laser sensor 4 capable of emitting a light plane 5, a calibrating mechanism 6 and a base plane 7. Firstly, a Cartesian coordinate X-Y-Z is defined, wherein the X, Y, and Z axes are perpendicular to each other. The laser sensor 4 and the calibrating mechanism 6 are fixed to the base plane 7, wherein the base plane 7 is parallel to XZ plane. Moreover, the laser sensor 4 can detect light and generate a two-dimensional digital image 8 as shown in FIG. 3B. A computer (not shown) connects the laser sensor 4 to record and calculate the digital image data.

As shown in FIG. 2, the calibrating mechanism 6 has a flat block 61, a rotating portion 62 and a translating portion 63. The flat block 61 is provided with a calibrating surface 610 thereon to receive light. The laser sensor 4 projects a light plane 5 on the calibrating surface 61 forming a bright line 51 while calibrating. The laser sensor 4 receives the reflected light of the bright line 51 and generates a corresponding digital image. The calibration of the present invention is accomplished by setting up the laser sensor 4 and operating the calibrating mechanism 6.

The flat block 61 of the present invention is utilized primarily to calibrate. Referring FIG. 2, the flat block 61 connects the rotating portion 62, wherein the rotating portion 62 connects the translating portion 63. Moreover, the flat block 61 can translate along a translating axis 631 by the translating portion 63 and rotates along a rotating axis 621 by the rotating portion 62. As shown in FIG. 2, the translating axis 631 is parallel to the Z axis, and the rotating axis 621 is parallel to the Y axis and perpendicular to the base plane 7. In this embodiment, the translating portion 62 is a linear guild way and the rotating portion 63 is a rotating platform driven by a motor connected to a reduction mechanism.

The calibration of the present invention is described in the following steps:

Step 1: adjusting the light plane 5 parallel to the XZ plane. Thus, each point on the light plane 5 has the same coordinate in the Y direction such that the bright line 51 on the calibrating surface 610 also has the same Y coordinate.

Step 2: establishing a mapping table of the two-dimensional digital image and the Z axis. After step 1 is complete, the calibrating surface 610 is adjusted perpendicular to the Z axis by rotating the flat block 61 and a plurality of calibrating positions in the Z direction are predetermined then the flat block 61 translates along the translating axis 631 through each calibrating position sequentially. Thus, a series of digital images of the bright line 51 on the calibrating surface 610 corresponding to each calibrating positions is acquired.

Figure 3A:
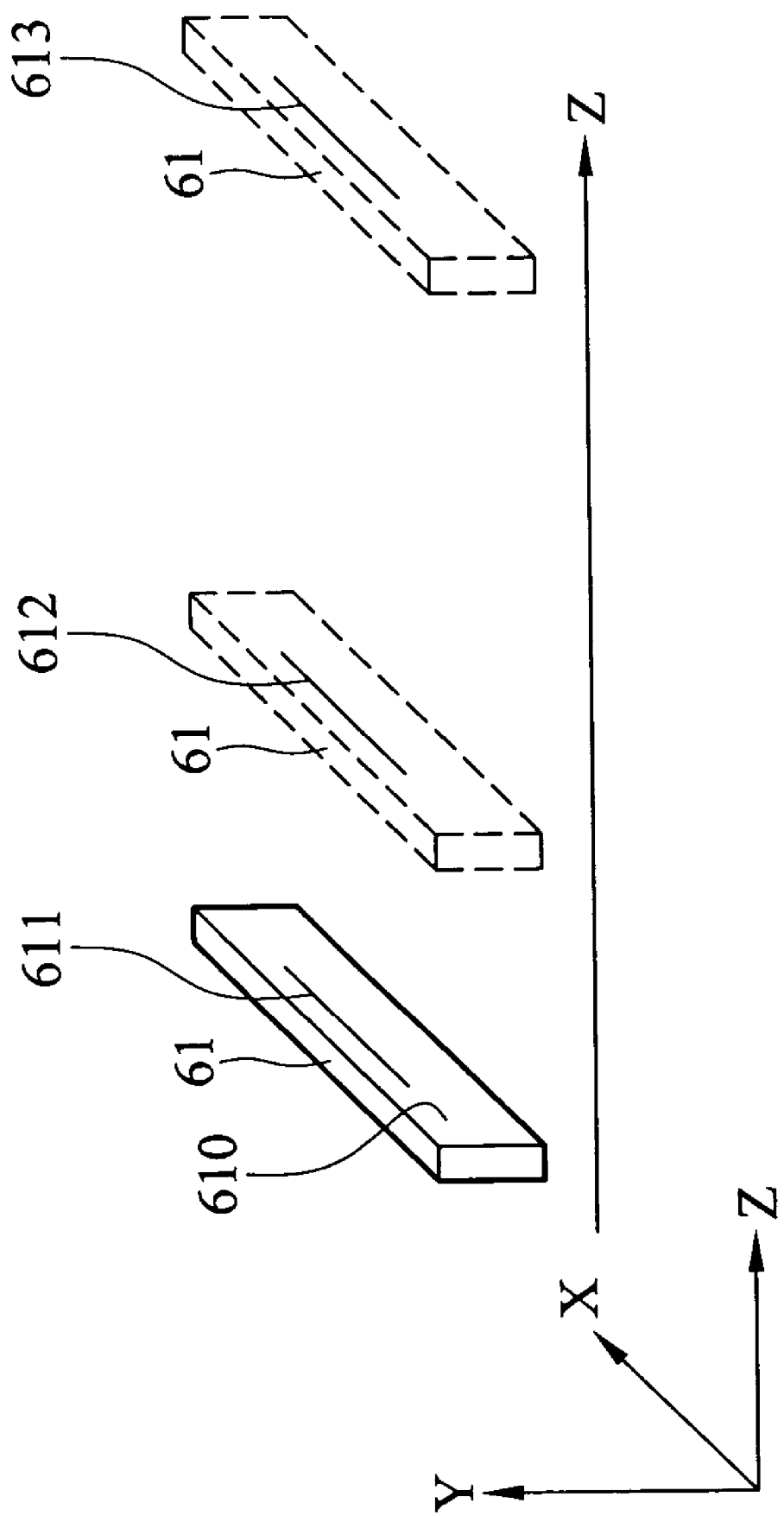
FIG. 3A is a diagram of the flat block at different calibrating positions along the Z axis.
Figure 3B:
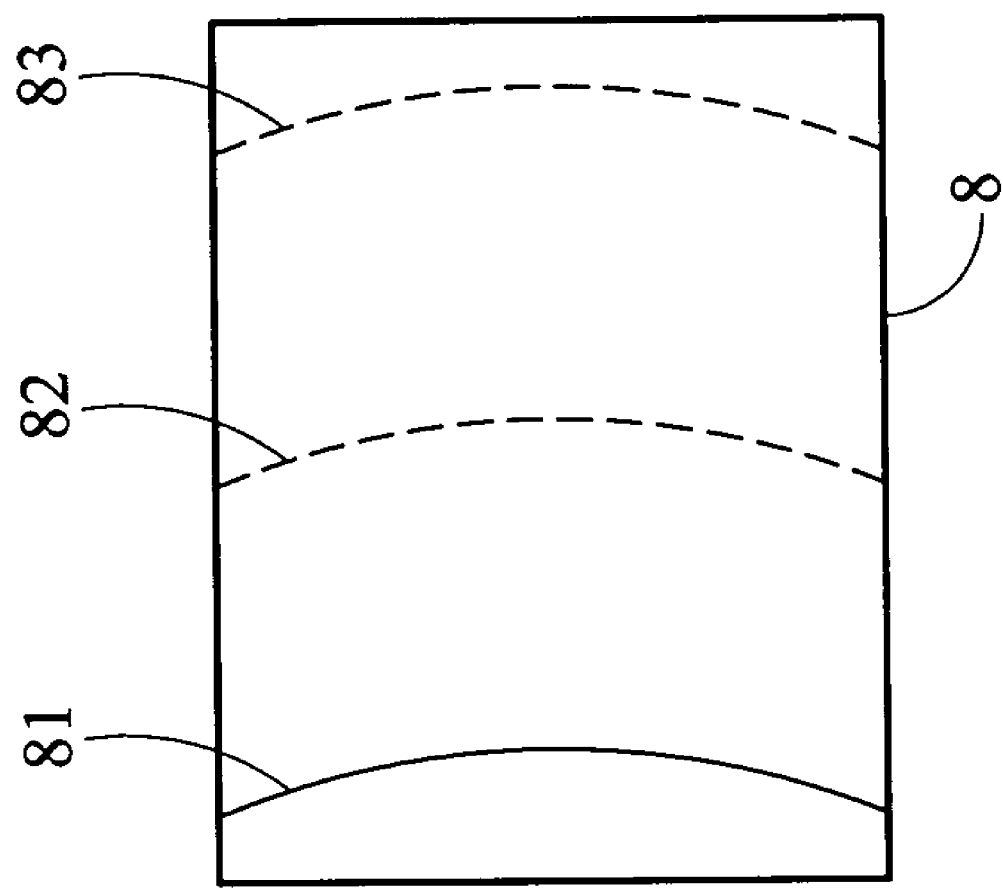
FIG. 3B is a diagram illustrating a digital image showing the bright lines at different calibrating positions respectively corresponding to FIG. 3A.

FIG. 3A is a diagram of the flat block 61 at different calibrating positions along the Z axis. In FIG. 3A, the flat block 61 is driven to translate along the Z axis by the translating portion 63. Particularly, the light plane 5 emitted from the laser sensor 4 projects on the calibrating surface 610 sequentially forming a bright line 611 at an initial position, a bright line 611 at a first position and a bright line 611 at a second position respectively. Referring to FIG. 3B, the digital image 8 having distinct bright lines 81, 82 and 83 are generated by the laser sensor 4 detecting the bright lines 611, 612 and 613, wherein the bright lines 81, 82 and 83 of the digital image 8 correspond to the bright lines 611, 612 and 613 on the calibrating surface 610 respectively.

As mentioned above, every distinct digital image 8 corresponds to each predetermined position in the Z axis is acquired. Thus, a unique mapping table of the two-dimensional digital image to the Z axis can be established and recorded within the measurement scope of the laser sensor 4.

Step 3: establishing a mapping table of the two-dimensional digital image and X axis. After step 2, the flat block 61 then rotates an angle θ along the rotating axis 621 at the center of the flat block 61. As the mapping table of the two-dimensional digital image to the Z axis is determined from step 2, the mapping table of the two-dimensional digital image to the X coordinate can also be analogously determined by acquiring the digital images, predetermining calibrating positions along the X axis and referring to the result of step 2.

Figure 4:
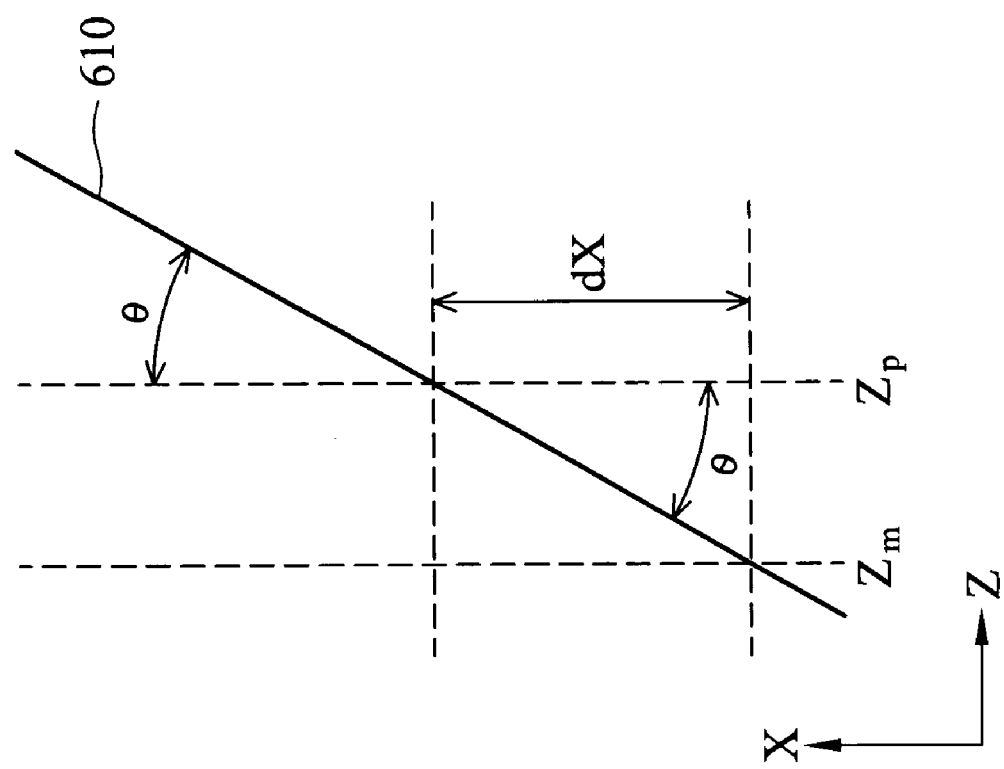
FIG. 4 is a diagram of the flat block rotating an angle θ to calibrating X coordinate.

FIG. 4 illustrates the flat block rotating an angle θ to calibrate the X coordinate. As shown in FIG. 4, Zp is the coordinate at the center of the flat block 61 in the Z direction, and Zm is the coordinate of a point of the bright line on the calibrating surface 610 in the Z direction. Zm can be determined by the acquired digital image and the mapping table of the two-dimensional digital image to the coordinate X from step 2. Therefore, as the rotating angle θ of the flat block 61, Zp and Zm are determined, the coordinate dX in the X direction of the calibrating surface 610 corresponding to Zm can be also determined according to the following equation, wherein the center of the flat block 61 is set to be the origin.

$$dX=(Zp-Zm)\cot(\theta);$$

According to the equation mentioned above, the flat block 61 rotates an angle θ along the rotating axis 621 then translates along the Z axis through a plurality of calibrating positions predetermined in the Z direction sequentially. Subsequently, a series of digital images corresponding to each calibrating position can be acquired by the laser sensor 4. Thus, a unique mapping table of the two-dimensional digital image to the X axis is established and recorded within the measurement scope of the laser sensor 4.

As the light plane 5 has been adjusted parallel to the XZ plane, each point of the bright line 51 on the calibrating surface 610 has the same Y coordinate. Thus, the two-dimensional digital image mapping to 3D space coordinates is achieved.

However, if step 1 has not been performed or it is difficult to adjust the light plane 5 to be parallel to the XZ plane, the following step 4 analogous to step 3 is now required.

Step 4: establishing a mapping table of the two-dimensional digital image and the Y axis. If the light plane is not parallel to the XZ plane, the flat block 61 then rotates an angle Φ to establish the mapping table of the two-dimensional digital image to the Y axis.

Figure 5:
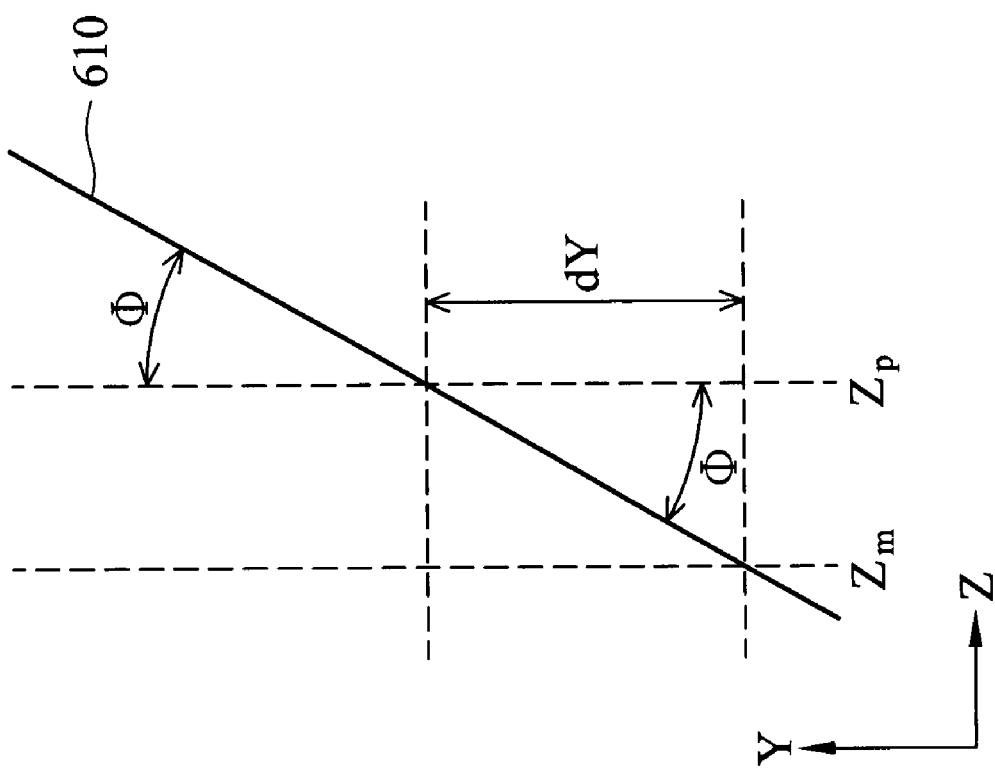
FIG. 5 is a diagram of the flat block rotating at an angle Φ to calibrate a Y coordinate.

FIG. 5 illustrates the flat block rotating at an angle Φ to calibrate the Y axis. As shown in FIG. 5, Zp is the coordinate of the center of the flat block 61 in the Z direction, and Zm is the coordinate of a point of the bright line on the calibrating surface 610 in the Z direction. Zm can be determined by the acquired two-dimensional digital image data stored in the mapping table to the X coordinate from step 2.

Therefore, as the rotating angle Φ of the flat block 61, Zp and Zm are determined, the coordinate dY in the Y direction of the calibrating surface 610 corresponding to Zm can be determined, wherein the center of the flat block 61 is set to be the origin.

$$dY=(Zp-Zm)\cot(\Phi);$$

According to the equation mentioned above, the calibration in the Y direction can be accomplished by the flat block 61 rotates at an angle Φ along the X axis then translates along the Z axis through a plurality of predetermined calibrating positions in the Z direction sequentially. Analogous to step 3 mentioned above, a series of digital images corresponding to each calibrating positions in the Z direction can be acquired by the laser sensor 4. Thus, a unique mapping table of the two-dimensional digital image to the Y axis is established and recorded within the measurement scope of the laser sensor 4.

In this embodiment, only a rotating axis 621 in Y direction is provided. However, when the flat block 61 rotating along both X and Y axes are required, the rotating portion 62 can also be replaced by an angular block having an inclined angle of θ or Φ to form a predetermined angle between the calibrating surface and the light plane.

According to the steps mentioned above in the present invention, the calibration of 3D space can be accomplished by creating the mapping tables of the two-dimensional digital image to the X, Y and the Z axis respectively. Particularly, the mapping table can be further completed by filling the blank area between each calibrating positions by interpolation. The 3D measurement system is more precise because the calibrating positions are set more densely.

In summary, the present invention provides a method and apparatus for calibrating a laser three-dimensional (3D) digitizing sensor having a simple calibrating mechanism with only a rotating axis and a translating axis such that it is easy to set up and operate. The present invention provides a method of easily installing the laser sensor on a platform without requiring sloped suspension of the laser sensor such that it is more precise, stable and has a lower frequency of random errors. Furthermore, utilizing the mapping tables of the two-dimensional digital image to produce 3D coordinates can reduce computing time and simplify the calculation processes required to fit different kinds of optical lens sets.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for calibrating a laser three-dimensional digitizing sensor, comprising:
    defining a three-dimensional coordinate system X-Y-Z;
    providing a calibrating surface;
    projecting a laser light plane onto the calibrating surface to form a bright line thereon, which is detected by the laser three-dimensional digitizing sensor to generate a two-dimensional digital image, wherein the laser light plane and the bright line are parallel to the X-Z plane;
    translating the calibrating surface along the Z axis to establish a first table of the two-dimensional digital image corresponding to the Z coordinate
    rotating the calibrating surface by a predetermined first angle along the Y axis then translating along the Z axis to establish a second table of the two-dimensional digital image corresponding to the X coordinate according to the established first table.

2. The method for calibrating a laser three-dimensional digitizing sensor as claimed in claim 1 further comprising the following step:
    rotating the calibrating surface by a predetermined second angle along the X axis then translating along the Z axis to establish a third table of the two-dimensional digital image corresponding to the Y coordinate according to the established first table.

3. An method for calibrating a laser three-dimensional digitizing sensor, comprising:
    providing a base plane, a laser sensor generating a laser light plane, a flat block having a calibrating surface, a rotating axis perpendicular to the base plane, a translating axis perpendicular to the rotating axis;
    projecting the laser light plane onto the calibrating surface forming a bright line;
    adjusting the laser light plane parallel to the base plane;
    adjusting the flat block such that the calibrating surface is perpendicular to the translating axis;
    translating the flat block to a plurality of predetermined calibrating positions along the translating axis then recording corresponding bright line images made by the laser sensor at each calibrating position to establish a first table corresponding to the coordinate along the translating axis;
    rotating the flat block a predetermined angle along the rotating axis, translating the flat block to the calibrating positions along the translating axis, then recording corresponding bright line images made by the laser sensor at each calibrating position to establish a second table corresponding to the coordinate along an axis perpendicular to the translating axis and the rotating axis from the established first table.

* * * * *